United States Patent Office 3,534,635
Patented Oct. 20, 1970

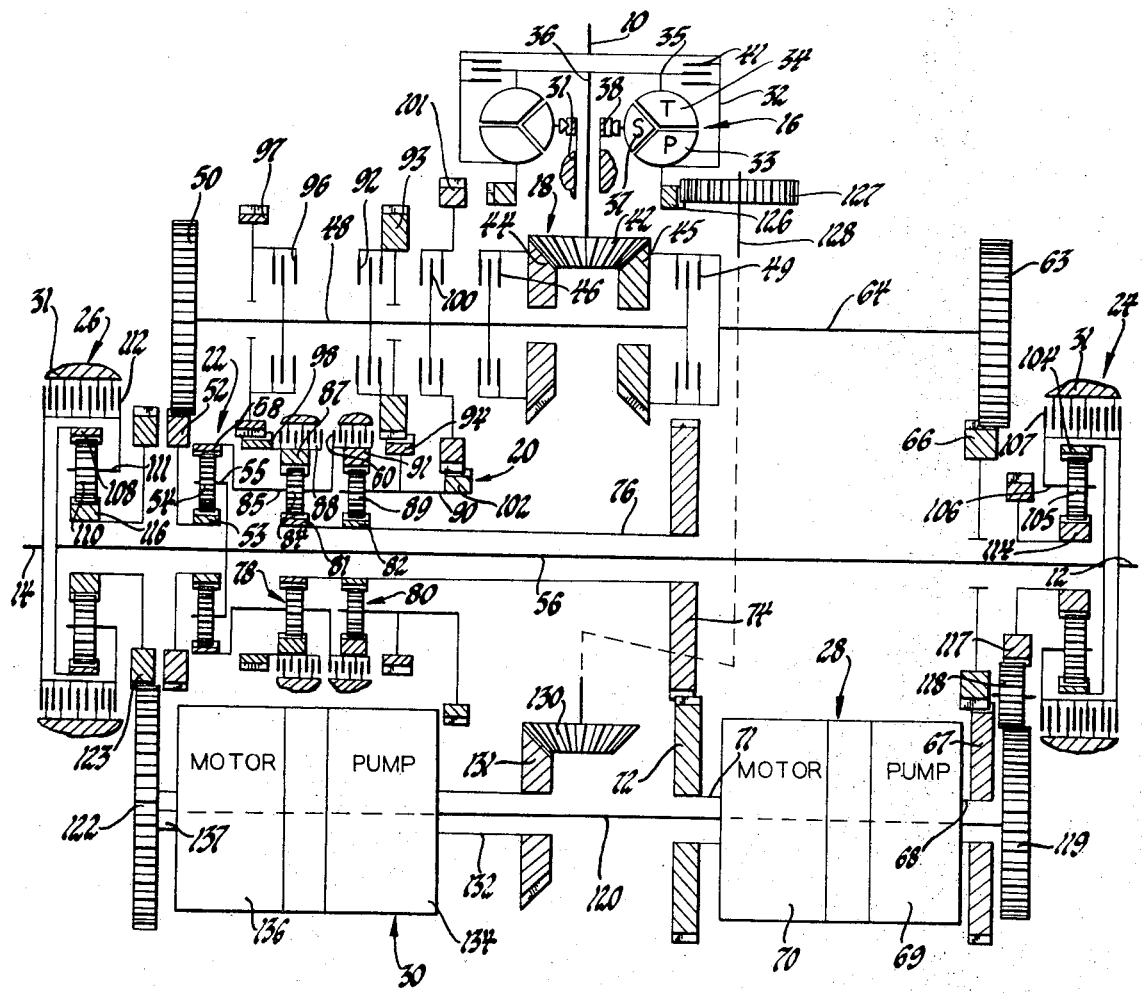

3,534,635
POWER TRAIN
James C. Polak, Indianapolis, Ind., assignor to General Motors Corporation, Detroit, Mich., a corporation of Delaware
Filed Nov. 27, 1968, Ser. No. 779,353
Int. Cl. F16h *37/10, 47/08*
U.S. Cl. 74—720.5                                9 Claims

ABSTRACT OF THE DISCLOSURE

A power train is shown having an input driven hydrodynamic torque converter and a converter driven variable ratio hydrostatic drive unit. A multispeed power combining unit is connected to be driven simultaneously through one power bath by the hydrostatic drive unit and through one of a plurality of selectively establishable power paths by the power train input. A torque multiplying-power combining unit is connected to be selectively driven singularly by the converter and driven simultaneously by the power train input and the multispeed power combining unit. For use in nonsteer-by-driving vehicles, output is taken directly from the torque multiplying-power combining unit and for use in steer-by-driving vehicles, this output is delivered to twin steer units which provide two outputs. An input driven variable ratio hydrostatic steer unit is connected to provide drives of opposite direction to the steer units for the steer bias of the two power train outputs.

---

This invention relates to power trains and more particularly to a single input, single and dual output power train providing hydrodynamic torque converter drive and hydrostatic-mechanical drives.

The invention is illustrated in a power train for a tracklaying vehicle, the power train comprising an input shaft which is connected to drive a hydrodynamic torque converter which drives a variable ratio hydrostatic drive unit. A multi-speed power combining planetary gear unit having two planetary gear sets is connected to be driven simultaneously by the input shaft through a converter lockup clutch and a forward and reverse drive in three selective power paths and by the hydrostatic drive unit. A torque multiplying-power combining planetary gear unit having a single planetary gear set is connected to be driven singularly by the converter through the forward and reverse drive and also driven simultaneously by the input shaft through the lockup clutch and the forward and reverse drive and by the multispeed power combining planetary unit with its plural input drives. The output from the torque multiplying-power combining planetary gear unit is delivered as one input to twin steer planetary gear units each having a single planetary gear set connected to drive one of the power train's two output shafts. A variable ratio hydrostatic steer unit driven by the input shaft is connected to provide drives of opposite direction as another input to the steer planetary gear sets for steer bias of the output shafts.

With this arrangement there are provided five drive ranges in forward and reverse with steer operation available in each drive range. In the first drive range there is provided hydrodynamic torque converter drive which transmits full power through the power train. In the second drive range there is provided hydromechanical drive and in each of the three remaining higher drive ranges there is provided a different type of hydromechanical drive which may be termed a mechanical-hydromechanical drive, i.e., mechanical drive sharing the power transmittal with hydrostatic-mechanical drive. By this combination of drives, the hydrostatic drive unit transmits a smaller percentage of the power through the power train and thus its power capacity requirement is reduced as compared with power trains having power flow always through a hydrostatic drive unit and any number of parallel mechanical power paths. Another feature of this arrangement is that the drives are established by drive establishing devices which are speed synchronized at optimum shift points. The output from the torque multiplying-power combining planetary gear unit is also available for use in single output drive applications.

An object of the present invention is to provide a new and improved power train.

Another object is to provide a single input, single and dual output power train providing hydrodynamic torque converter drive for full power transmittal and a plurality of hydromechanical drives for shared power transmittal.

Another object is to provide in a power train a hydrodynamic torque converter providing drive to a planetary unit to effect drive in one drive range with this same planetary unit receiving both a mechanical input drive and an input drive by a multispeed power combining planetary unit having selective hydrostatic input drive and parallel mechanical and hydrostatic input drive to effect drive in higher drive ranges.

Another object is to provide in a power train a hydrodynamic torque converter combined with planetary gearing, a hydrostatic drive unit and a hydrostatic steer unit to provide full converter drive in one drive range, hydromechanical drive including mechanical-hydromechanical drive in other drive ranges and hydrostatic steer in all of the drive ranges and neutral.

These and other objects of the invention will become more apparent from the following description and drawing which diagrammatically shows a power train arrangement according to this invention.

POWER TRAIN ARRANGEMENT

The invention is illustrated for use in a track-laying vehicle power train. The power train generally comprises a prime mover driven input shaft 10 operatively connected to drive a right and left track powering or steerdrive output shaft 12 and 14 by a hydrodynamic torque converter 16, a forward and reverse drive unit 18, a multispeed power combining planetary gear unit 20, a torque multiplying or drive establishing power combining planetary gear unit 22, a right and left steer planetary gear unit 24 and 26, and a variable ratio hydrostatic drive unit 28 with a variable ratio hydrostatic steer unit 30 provided for effecting steer bias. All of these components are suitably supported in a housing 31 with the axis of input shaft 10 arranged to extend longitudinally of the vehicle to provide what is referred to as a "T" input drive through converter 16 to the power train which has the central axis of each component 12, 14, 18, 20, 22, 24, 26, 28 and 30 arranged to extend transversely of the vehicle, output shafts 12 and 14 being axially aligned. With this drive arrangement, the power train is operable to provide in both forward and reverse, a full converter drive in the lowest drive range and hydromechanical drive in four higher drive ranges with steering in each drive range and in neutral.

The power train input shaft 10 is connected by converter housing 32 to pump blading 33 (P), the converter housing being rotatably supported and providing a rotatable housing for the remaining blading of converter 16. The pump blading 33 exists to turbine blading 34 (T) which is connected by a hub 35 to a turbine or converter output shaft 36. Fluid is circulated toroidally in the converter and, as it leaves the turbine blading 34, it is redirected to the pump blading 33 by stator blading 37 (S) which stator blading is connected to a one-way brake 38 grounded to the power train housing 31. The converter is a three element converter of conventional design and provides torque multiplication in the conventional manner. The converter has a lockup clutch 41 which clutch, when actuated by any suitable known control means is effective to provide a direct mechanical drive between input shaft 10 and converter output shaft 36 bypassing the converter's hydraulic power path.

The converter output shaft 36 is connected to drive bevel gear 42 of the forward and reverse drive unit 18. Gear 42 meshes at diametrically opposite sides with annular bevel gears 44 and 45 which latter two gears are thus driven in opposite directions. Gear 44 is connected by engagement of forward drive clutch 46 in unit 18 to a power transfer shaft 48 and alternatively, the opposite gear 45 is connected by engagement of a reverse drive clutch 49 to the power transfer shaft 48 which is arranged to extend through gears 44 and 45 and transversely of the vehicle.

One drive to the torque multiplying-power combining unit 22 is provided by a spur gear 50 which is connected to the left end of power transfer shaft 48 and meshes with an annular spur gear 52. Gear 52 is connected to sun gear 53 of the single planetary gear set in unit 22. Sun gear 53 meshes with a plurality of pinions 54 carried on carrier 55 which is connected to a cross shaft 56, this shaft extending through sun gear 53 and gear 52 and being arranged between and axially aligned with the power train output shaft 12 and 14. Pinions 54 mesh with ring gear 58 which is grounded to housing 31 by engagement of a first drive range brake 60.

Drive to the multispeed power combining unit 20 is selectively provided through a hydraulic power path and simultaneously through this hydraulic power path and one of a plurality of selectively establishable mechanical power paths. The hydraulic power path is provided through the hydrostatic drive unit 28 to which drive is delivered by a spur gear 63 which is connected to the bevel gear 45 by shaft 64, shaft 64 being axially aligned with the power transfer shaft 48. Gear 63 meshes with an annular spur gear 66 rotatable about the shaft 56 which extends therethrough. Gear 66 meshes with an annular spur gear 67 which is connected by a sleeve shaft 68 to drive pump 69 of the hydrostatic drive unit 28, the pump being hydraulically connected to the axially aligned motor 70 of this unit. The motor 70 is connected to drive a sleeve shaft 71 which is connected to an annular spur 72. Gear 72 meshes with an annular spur gear 74 which is connected to a sleeve shaft 76 through which cross shaft 56 extends.

The multispeed power combining unit 20 has a pair of planetary gear sets 78 and 80 having an annular sun gear 81 and 82, respectively, connected to the motor driven sleeve shaft 76. Sun gear 81 meshes with a plurality of pinions 84 carried on carrier 85 which is connected to drive ring gear 58 of unit 22, carrier 85 also serving to connect ring gear 58 to the first drive range brake 60. Pinions 84 mesh with a ring gear 87 which is grounded to housing 31 by engagement of a second drive range brake 88. The other sun gear 82 meshes with pinions 89 carried on carrier 90. Pinions 89 mesh with ring gear 91 which is connected by carrier 85 of gear set 78 to drive ring gear 58 of unit 22.

There are provided three selectively establishable drives for delivering mechanical power to the multispeed power combining unit 20. One of these mechanical drives is provided by engagement of a third drive range clutch 92 which connects power transfer shaft 48 to an annular spur gear 93, both clutch 92 and gear 93 being located about this shaft. Gear 93 meshes with an annular spur gear 94 which is located about shaft 76 and is connected to carrier 90 of gear set 80 in unit 20. Another mechanical drive is provided by engagement of a fourth drive range clutch 96 which connects power transfer shaft 48 to an annular spur gear 97, both clutch 96 and gear 97 being located about this shaft. Gear 97 meshes with an annular spur gear 98 which is located about shaft connected to ring gear 87 of gear set 78 in unit 20. The third mechanical drive is provided by engagement of a fifth drive range clutch 100 which connects power transfer shaft 48 to an annular spur gear 101 located about this shaft. Gear 101 meshes with an annular spur gear 102 which is connected to carrier 90 of gear set 80 in unit 20, this gear train connection providing a faster speed drive to carrier 90 than that through gears 93 and 94 by engagement of the third drive range clutch 92.

The output drive from the torque multiplying-power combining unit 20 is delivered to both the steer units 24 and 26. For this drive the cross shaft 56 is connected at its right end to drive ring gear 104 of the right steer unit 24. Ring gear 104 meshes with a plurality of pinions 105 carried on carrier 106 which is connected to the right output shaft 12. A right vehicle brake 107 is connected to brake the right output shaft 12 through carrier 106. Similarly, the left end of cross shaft 56 is connected to drive ring gear 108 of the left steer unit 26. Ring gear 108 meshes with a plurality of pinions 110 carried on carrier 111 which is connected to drive the left output shaft 14. A left vehicle brake 112 is connected to brake the left output shaft 14 through carrier 111. Sun gear 114 meshing with pinions 105 of the right steer unit and sun gear 116 meshing with pinions 110 of the left steer unit are connected by a direction reversing gear train. This gear train has at its right end an annular spur gear 117 which is located about cross shaft 56, is connected to sun gear 114 of the right steer unit and is in mesh with an idler spur gear 118. Idler gear 118 meshes with a spur gear 119 which is connected to the right end of a countershaft 120 which freely extends centrally through the hydrostatic drive unit 28 and is connected at its left end to a spur gear 122. Gear 122 meshes with an annular spur gear 123 which is located about cross shaft 56 and is connected to sun gear 116 of the left steer unit.

Steering operation is made available in the power train arrangement by the hydrostatic steer unit 30 which is driven by the input shaft 10 and is connected to drive the direction reversing gear train between the sun gears 114 and 116 of the steer units. In this steer drive portion of the power train arrangement the converter housing 32 is connected to an annular spur gear 126 which is located about converter output shaft 36 and meshes with a spur gear 127. A countershaft 128 extending parallel with the aligned input shaft 10 and converter output shaft 36 is connected at one end to gear 127 and at the other end to a bevel gear 130. Bevel gear 130 meshes at right angles with a bevel gear 131 which is connected to a sleeve shaft 132 located about countershaft 120. Shaft 132 is connected to drive pump 134 of the hydrostatic steer unit 30, the pump 134 being hydraulically connected to the axially aligned hydrostatic motor 136 of this unit. The steer motor 136 is connected by a sleeve shaft 137 to drive gear 122 and thus the gear train between the sun gears 114 and 116 of the steer units, sleeve shaft 137 being located about countershaft 120.

Both hydrostatic units 28 and 30 are of conventional design with each pump having a variable displacement and each motor having a fixed displacement, the speed and direction of the motor output being controlled by any suitable conventional pump displacement control mechanism. The various brakes and clutches employed in the power train are conventional friction engaging devices of the multiplate type. The devices which establish drive, thus excepting the vehicle brakes, may be actuated in any known way, i.e., electrically, hydraulically, pneumatically or by some other mechanical provision and in a certain sequence. The preferred sequence for the drive establishing devices is described in the following illustrative operational summary.

OPERATION

The power train may be operated to provide five drive ranges in forward and reverse and hydrostatically controlled steering. For neutral either of the directional drive clutches, forward drive clutch 46 or reverse drive clutch 49, may be engaged and all of the other drive establishing devices are disengaged to disconnect all power flow paths from the output shafts 12 and 14. In neutral, both the drive pump 69 and the steer pump 134 are normally conditioned for zero displacement and thus do not deliver power to the drive motor 70 and steer motor 136, respectively.

Steering is available in neutral with no propulsion drive to the output shafts 12 and 14 by conditioning of the hydrostatic steer unit 30 by its pump displacement control to power the steer motor output shaft 137 in either direction thereby causing one of the sun gears 114, 116 in the steer units to be driven in one direction and the other sun gear to be driven in the opposite direction at the same speed. Since the ring gears 104 and 108 in the steer units are connected they provide reaction and the output shafts 12 and 14 are driven at the same speed but in opposite directions to provide a true pivot steer about the vehicle center.

In the following operational description of the five drive ranges, the hydrostatic steer unit 30 will be considered as conditioned so that it delivers no output to the steer units 24 and 26 so that they are free of the steer drive. The description of steering operation will follow the drive range operation.

The first and lowest drive range is established by engaging either one of the directional drive clutches, forward drive clutch 46 or reverse drive clutch 49, and the first drive range brake 60, all other drive establishing devices being disengaged. With power to the input shaft 10, the converter drives the converter output shaft 36 and this drive is transmitted through the engaged directional clutch to the sun gear 53 of the torque multiplying-power combining unit 22, the drive direction being determined by which directional drive clutch is engaged. With the sun gear 53 thus driven by the converter and the ring gear 58 held for reaction by brake 60, the carrier 55 and connected shaft 56 and ring gears 104 and 108 of the steer units are caused to rotate at a reduced speed. The sun gears 114 and 116 of the steer units by their geared connection provide reaction causing the carriers 106 and 111 and thus output shafts 12 and 14 to rotate in the same direction at a reduced speed with the full converter drive thus provided. At the highest speed desired for converter operation, the converter lockup clutch 41 is engaged and this lockup clutch engagement is maintained throughout the remainder of the first drive range and throughout all of the remaining higher drive ranges.

To shift from the first to the second drive range in either forward or reverse, which is determined by the directional drive clutch that is engaged, the first drive range brake 60 is released and the second drive range brake 88 is engaged. Since carrier 85 and sun gear 81 in gear set 78 of unit 20 were stationary in the first drive range, the ring gear 87 was also stationary and thus the brake 88 is speed synchronized for this shift to the second drive range, i.e., no relative rotation between the plates of the second drive range brake 88. The hydrostatic drive unit 28 is then conditioned to drive sun gear 81 of gear set 78 in the same direction as sun gear 53 of unit 22, both the hydrostatic drive unit 28 and sun gear 53 being driven by all mechanical drive from input shaft 10 with lockup clutch 41 engaged to bypass the converter 16. The braked ring gear 87 causes carrier 85 of gear set 78 and connected ring gear 58 of unit 22 to rotate in the same direction as the driving sun gear 81 but at a reduced speed.

In the second drive range, displacement of the hydrostatic drive pump 69 is increased from zero to produce the drive to sun gear 81 of gear set 78 and to increase its speed and that of ring gear 58 in unit 22. Since ring gear 58 is rotating in the same direction as sun gear 53, their speed components are additive and the speed of carrier 55 and thus output shafts 12 and 14 increase with the increasing speed of ring gear 58 produced by increasing the speed of sun gear 81 with its hydrostatic input drive. The unit 22 thus combines the mechanical drive from the input shaft 10 through the engaged lockup clutch 41 and the engaged directional drive clutch to the sun gear 53 with the hydraulic power path through the hydrostatic drive unit 28 to the ring gear 58 to provide hydromechanical drive to the output shafts. In the second drive range in both forward and reverse, both sun gear 82 and ring gear 91 of gear set 80 are being driven in the same direction and cooperatively produce a drive to carrier 90 and thus a drive through gears 94 and 93 to the driven clutch member of the third drive range clutch 92. This arrangement enables the gear sizes to be selected so that at a predetermined speed of the drive motor 70, preferably maximum motor speed which occurs at maximum pump displacement, the driven clutch member is rotated in the same direction and at the same speed as the driving clutch member of the third drive range clutch 92.

The shift from second to the third drive range in either forward or reverse is preferably accomplished when the above speed synchronized condition of the third drive range clutch 92 is reached. The second drive range brake 88 is then released and the third drive range clutch 92 is engaged. Mechanical drive is then delivered through the engaged lockup clutch 41, the engaged directional drive clutch and the engaged third drive range clutch 92 to drive carrier 90 of gear set 80 in the same direction as sun gear 82 which is being driven by drive motor 70. Since the sun gear 82 is rotating in the some direction as carrier 90, the speed component of sun gear 82 subtracts from that of carrier 90 in the drive to ring gear 91. Thus the speed of ring gear 91 and connected ring gear 58 of unit 22 and therefore the speed of carrier 55 and output shafts 12 and 14 increases with decreasing speed of sun gear 82 until the latter gear reaches zero speed. Then when sun gear 82 is rotated in the opposite direction its speed component adds to that of carrier 90 so that the speed of ring gear 91 and thus the output shafts 12 and 14 then increase with increasing speed of sun gear 82 in this opposite direction. Thus in the third drive range, the displacement of drive pump 69 is initially decreased from its maximum displacement to decrease the speed of sun gear 82 to increase the speed of the output shafts 12 and 14 until zero displacement and thus zero speed of the sun gear 82 is reached. Then the speed of output shafts 12 and 14 is increased by increasing the displacement of drive pump 69 in the opposite sense to increase the speed of the sun gear 82 in the opposite direction with maximum output speed of drive motor 70 being reached when maximum displacement of the drive pump is reached. The torque multiplying-power combining unit 22 thus combines the mechanical drive from input shaft 10 to the sun gear 53 with the hydromechanical drive from the power combining unit 20 with its mechanical and hydrostatic power paths to provide mechanical-hydromechanical drive to the output shafts. Downshifting from third to the second drive range is also provided with a speed synchronized drive engaging condition at the second drive range brake 88 by the drive to the ring gear 87 of gear set 78 which conditions the ring gear 87 at zero speed at the initial maximum drive motor speed in the third drive range.

In the third drive range the sun gear 81 is rotating with the sun gear 82 and the carrier 85 is rotating in the opposite direction at the upper end of this range and these two drives combine in the gear set 78 to produce a drive to the ring gear 87 and thus a drive through gears 98 and 97 to the driven clutch member of the fourth drive range clutch 96. This arrangement enables the gear sizes to be selected so that at the maximum speed of drive motor 70 the driven clutch member is rotated in the same direction and at the same speed as the driving clutch member of the fourth drive range clutch 96.

The shift from third to fourth drive range in either forward or reverse is preferably accomplished when the above speed synchronized condition of the fourth drive range clutch 96 is reached. The third drive range clutch 92 is then released and the fourth drive range clutch 96 is engaged. Mechanical drive is then delivered through the engaged lockup clutch 41, the engaged directional drive clutch and the engaged fourth drive range clutch 96 to drive ring gear 87 of gear set 78 in a direction opposite to that of sun gear 81 which is being driven by drive motor 70. Since the sun gear 81 is rotating in a direction opposite to that of ring gear 87, the speed component of sun gear 81 subtracts from that of ring gear 87 in the drive to carrier 85. Thus the speed of carrier 85 and connected ring gear 58 of unit 22 and therefore the speed of carrier 55 and output shafts 12 and 14 increases with decreasing speed of sun gear 81 until the latter gear reaches zero speed. Then when sun gear 81 is rotated in the opposite direction its speed component adds to that of ring gear 87 so that the speed of carrier 85 and thus the output shafts 12 and 14 then increases with increasing speed of sun gear 81 in this opposite direction. Thus in the fourth drive range the displacement of drive pump 69 is decreased from its maximum to zero to increase the speed of ring gear 58 of unit 22 and is then increased to maximum displacement of the opposite sense to continue increasing the speed of the ring gear 58 to continuously increase the speed of output shafts 12 and 14. The unit 22 thus combines the mechanical drive from input shaft 10 to the sun gear 53 with the hydromechanical drive from unit 20 with its mechanical and hydrostatic power paths to provide another mechanical-hydromechanical drive of higher speed ratio to drive the output shafts. Downshifting from fourth to the third drive range is also provided with a speed synchronized drive engaging condition at the third drive range clutch 92 by the drive to carrier 90 of gear set 80, this condition occurring at the initial maximum drive motor speed in the fourth drive range.

In the upper end of the fourth drive range both the sun gear 82 and ring gear 91 of gear set 80 are being driven in the same direction and cooperatively produce a drive to carrier 90 and thus a drive through gears 102 and 101 to the driven member of the fifth drive range clutch 100. This arrangement enables the gear sizes to be selected so that at maximum speed of drive motor 70 the driven clutch member is rotated in the same direction and at the same speed as the driving clutch member of the fifth drive range clutch 100.

The shift from fourth to the fifth drive range in either forward or reverse is preferably accomplished when the above speed synchronized condition of the fifth drive range clutch 100 is reached. The fourth drive range clutch 96 is then released and the fifth drive range clutch 100 is engaged.

Mechanical drive is then delivered through the engaged lockup clutch 41, the engaged directional drive clutch and the engaged fifth drive range clutch 100 to drive carrier 90 of gear set 80 in the same direction as sun gear 82 which is being driven by drive motor 70. Since sun gear 82 is rotating in the same direction as carrier 90, the speed component of sun gear 82 subtracts from that of carrier 90 in the drive to ring gear 91 like in the third drive range. Thus the speed of ring gear 91 and connected ring gear 58 of unit 22 and therefore the speed of carrier 55 and output shafts 12 and 14 increases with decreasing speed of sun gear 82 until the latter gear reaches zero speed. Then when sun gear 82 is rotated in the opposite direction its speed component adds to that of carrier 90 so that the speed of ring gear 91 and thus output shafts 12 and 14 then increases with increasing speed of sun gear 82 in this opposite direction. Thus in the fifth drive range the displacement of drive pump 69 is decreased from its maximum to zero and is then increased to maximum displacement of opposite sense to continuously increase the speed of output shafts 12 and 14. The unit 22 thus combines the mechanical power path from input shaft 10 to the sun gear 53 with the hydromechanical drive from unit 20 with its mechanical and hydrostatic power paths to provide another mechanical-hydromechanical drive of higher speed ratio to drive the output shafts. Downshifting from fifth to the fourth drive range is also provided with a speed synchronized drive engaging condition at the fourth drive range clutch 96 by the drive to ring gear 87 of gear set 78, this condition occurring at the initial maximum drive motor speed in the fifth drive range.

Describing now the steering operation, steering of the differential type is available in all five drive ranges in forward and reverse by control of the hydrostatic steer unit 30 to drive the previously free geared sun gears 114 and 116 of the steer units 24 and 26 in opposite directions at the same speed. The sun gears 114 and 116, which provided only reaction in the drive ranges, are caused to rotate in opposite directions at the same speed by increasing the displacement of the steer pump 134 in either sense from its zero displacement condition. For example when sun gear 114 is caused to be driven in the same direction as ring gear 104 in steer unit 24 by steer motor 136, it adds to the output drive to carrier 106 to increase the speed of output shaft 12 while sun steer gear 116 in the other steer unit 26 subtracts from the drive of ring gear 108 to carrier 111 to decrease the speed of output shaft 14 by the same amount that the speed of output shaft 12 has been increased.

With my power train arrangement and particularly by the combination of the full converter drive in the lowest drive range and the hydromechanical drives in the higher drive ranges with mechanical drive through the converter lockup clutch, the power capacity requirements for the hydrostatic drive unit are low as compared with power trains of the type having a hydrostatic power path combined with any number of parallel mechanical power paths. It will be further understood that while my power train has been illustrated with dual output for use in a track-laying vehicle, the power train can also be applied to a vehicle requiring only one power train output by using output directly from the shaft 56 which thus serves as the power train's output shaft for example.

The above described preferred embodiment is illustrative of the invention which may be modified within the scope of the appended claims.

I claim:

1. In a power train the combination of an input shaft; an output shaft; a hydrodynamic torque converter connected to be driven by said input shaft; variable ratio hydrostatic drive means connected to be driven by said hydrodynamic torque converter; mechanical drive means; power combining means operatively connected to be driven simultaneously through one power path by said hydrostatic drive means and through said mechanical drive means via at least one selectively establishable mechanical power path by said input shaft; and drive establishing-power combining means operatively connected to drive said output shaft and operatively connected to be selectively singularly driven by said hydrodynamic torque converter and simultaneously driven by said power combining means and through said mechanical drive means via a mechanical power path by said input shaft.

2. The power train set forth in claim 1 and all of said mechanical power paths provided through a common drive establishing means mechanically bypassing said hydrodynamic torque converter.

3. The power train set forth in claim 1 and said power combining means operatively connected to be driven through one of a plurality of selectively establishable mechanical power paths by said input shaft.

4. The power train set forth in claim 1 and variable ratio hydrostatic steer means connected to be driven by said input shaft, a pair of steer means each connected to drive a steer-drive output shaft and both operatively connected to be singularly driven by said output shaft for conjoint drive of said steer-drive output shafts and simultaneously driven by said output shaft and said variable ratio hydrostatic steer means for differential drive of said steer-output shafts.

5. In a power train the combination of an input shaft; an output shaft; a hydrodynamic torque converter having a pump, a turbine and a stator; said pump connected to be driven by said input shaft; a converter output shaft connected to be driven by said turbine; a converter lockup clutch for locking up said converter and connecting said input shaft to drive said converter output shaft; mechanical drive means; drive establishing-power combining planetary gear means having an input member connected by said mechanical drive means to be driven by said converter output shaft, a reaction-input member connected to a first drive range brake and an output member connected to drive said output shaft; variable ratio hydrostatic drive means connected to be driven by said converter output shaft; power combining planetary gear means having an input member connected to be driven by said variable ratio hydrostatic drive means, a reaction member connected to a second drive range brake and an output member connected to said reaction-input member of said drive establishing-power combining planetary gear means whereby engagement of said first drive range brake and disengagement of both said lockup clutch and said second drive range brake provides full converter drive for driving said output shaft in a first drive range and engagement of both said lockup clutch and said second drive range brake and disengagement of said first drive range brake provides hydromechanical drive for driving said output shaft in a second and higher drive range with ratio change by said variable ratio hydrostatic drive means.

6. The power train set forth in claim 5 and additional power combining planetary gear means having one input member connected to be driven by said variable ratio hydrostatic drive means, another input member selectively connected to be driven by said converter output shaft through drive means including a third drive range clutch and an output member connected to both said output member of said first mentioned power combining planetary gear means and said reaction-input member of said drive establishing-power combining planetary gear means whereby engagement of both said lockup clutch and said third drive range clutch and disengagement of both said first drive range brake and said second drive range clutch provides mechanical-hydromechanical drive for driving said output shaft in a third and higher drive range with ratio change by said variable ratio hydrostatic drive means.

7. The power train set forth in claim 6 and said input member, reaction-input member and output member of said drive establishing-power combining planetary gear means respectively being a sun gear, a ring gear and a carrier; said input member, reaction member and output member of said first mentioned power combining planetary gear means respectively being a sun gear, a ring gear and a carrier; said one input member, other input member and output member of said second mentioned power combining planetary gear means respectively being a sun gear, a carrier and a ring gear.

8. The power train set forth in claim 6 and drive means including a fourth drive range clutch for selectively drivingly connecting said converter output shaft to drive said reaction member of said first mentioned power combining planetary gear means whereby engagement of both said lockup clutch and said fourth drive range clutch and disengagement of said first drive range brake, said second drive range brake and said third drive range clutch provides a mechanical-hydromechanical drive for driving said output shaft in a fourth and higher drive range with ratio change by said variable ratio hydrostatic drive means.

9. The power train set forth in claim 8 and drive means including a fifth drive range clutch for selectively drivingly connecting said converter output shaft to drive said other input member of said second mentioned power combining planetary gear means at a speed faster than through engagement of said third drive range clutch whereby engagement of both said lockup clutch and said fifth drive range clutch and disengagement of said first drive range brake, said second drive range brake, said third drive range clutch and said fourth drive range clutch provides a mechanical-hydromechanical drive for driving said output shaft in a fifth and higher drive range with ratio change by said variable ratio hydrostatic drive means.

References Cited

UNITED STATES PATENTS

| 3,377,885 | 4/1968 | Tuck et al. | 74—720.5 |
| 3,405,574 | 10/1958 | Livezey | 74—720.5 |
| 3,426,621 | 2/1969 | Mooney et al. | 74—720.5 |

ARTHUR T. McKEON, Primary Examiner

U.S. Cl. X.R.

74—687